United States Patent
Amin et al.

(10) Patent No.: US 12,266,218 B2
(45) Date of Patent: Apr. 1, 2025

(54) METHOD AND SYSTEM FOR EXTRACTING INFORMATION FROM A DOCUMENT

(71) Applicant: JPMorgan Chase Bank, N.A., New York, NY (US)

(72) Inventors: Vrajesh Ricky Amin, Livingston, NJ (US); Ashish Singla, Harrison, NJ (US); Samantha Zucker, Hoboken, NJ (US); Dana Marie Niblack, Shoreline, WA (US); Stephen Musacchia, Glen Cove, NY (US); Lawrence Fata, Brick, NJ (US); Albert Naclerio, Bedford, NY (US); Hozefa Shabbir Zariwala, Ridgewood, NJ (US); Anirudh Hegde, Bangalore (IN); Yasser Thamby, Carrollton, TX (US); Saquib Ahmad, Bengaluru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 458 days.

(21) Appl. No.: 17/446,522

(22) Filed: Aug. 31, 2021

(65) Prior Publication Data
US 2022/0405499 A1    Dec. 22, 2022

(30) Foreign Application Priority Data
Jun. 18, 2021   (IN) .............. 202111027338

(51) Int. Cl.
*G06V 40/30*     (2022.01)
*G06N 20/00*     (2019.01)
(Continued)

(52) U.S. Cl.
CPC .......... *G06V 40/394* (2022.01); *G06N 20/00* (2019.01); *G06V 30/414* (2022.01); *H04N 1/00331* (2013.01); *H04N 1/00334* (2013.01)

(58) Field of Classification Search
CPC .... G06V 40/394; G06V 30/414; G06V 30/41; G06N 20/00; H04N 1/00331; H04N 1/00334
See application file for complete search history.

(56) References Cited

U.S. PATENT DOCUMENTS

| | | | |
|---|---|---|---|
| 6,526,410 B1 * | 2/2003 | Aoyama | G06F 40/194 707/999.005 |
| 2006/0173904 A1 | 8/2006 | Nakajima | |

(Continued)

OTHER PUBLICATIONS

"Mohammad A. ALGhalayini et. al., Introducing the POSSDI Process the Process of Optimizing the Selection of the Scanned Document Images, 2007, Advances and Innovations in Systems, Computing Sciences and Software Engineering, 313-324" (Year: 2007).*

(Continued)

*Primary Examiner* — Andrae S Allison
*Assistant Examiner* — Phuong Hau Cai
(74) *Attorney, Agent, or Firm* — GREENBLUM & BERNSTEIN, P.L.C.

(57) ABSTRACT

A method and computing apparatus for extracting information from a document are provided. The method includes receiving a document, extracting data from the document, assigning the document to a category from among a predetermined plurality of categories based on a result of the extracted data, and generating a structured output by formatting the extracted data based on the assigned category.

18 Claims, 6 Drawing Sheets

(51) Int. Cl.
*G06V 30/414* (2022.01)
*H04N 1/00* (2006.01)

(56) References Cited

U.S. PATENT DOCUMENTS

| | | | |
|---|---|---|---|
| 2007/0188793 | A1 | 8/2007 | Wakai |
| 2014/0033029 | A1 | 1/2014 | Pittenger et al. |
| 2014/0223284 | A1 | 8/2014 | Rankin, Jr. et al. |
| 2015/0078671 | A1* | 3/2015 | van Deventer ...... G06V 30/412 382/217 |

OTHER PUBLICATIONS

"Guangyu Zhu et. al., Signature Detection and Matching for Document Image Retrieval, Sep. 2008, IEEE Transactions on Pattern Analysis and Machine Intelligence, vol. 31, Issue 11" (Year: 2008).*

"M. Shridhar et. al., Real-Time Feature-Based Automatic Signature Verification, Oct. 2006, 10th International Workshop on Frontiers in Hardwiring Recognition, Universite de Tennes 1, La Baule, France" (Year: 2006).*

"Trani Marco Lorenzo et al., BIM and QR-code. A Synergic Application in Construction Site Management, 2014, Procedia Engineering, vol. 85, pp. 520-528" (Year: 2014).*

"Chad Cumby et. al., A Machine Learning Based System for Semi-Automatically Redacting Documents, Aug. 2011, Twenty-Third Innovative Applications of Artificial Intelligence Conference, vol. 25, No. 2" (Year: 2011).*

"Sovann En et. al., Pattern Localization in Historical Document Images Via Template Matching, Apr. 2017, 23rd International Conference on Pattern Recognition, Cancun, Mexico" (Year: 2017).*

"Thomas Schulz, Signature Matching in Document Image Retrieval, Nov. 2014, Computer Vision Lab, Institute of Computer Aided Automation Vienna University of Technology" (Year: 2014).*

International Search Report and Written Opinion in corresponding International PCT Application No. PCT/US2022/033624, dated Sep. 23, 2022.

* cited by examiner

METHOD AND SYSTEM FOR EXTRACTING INFORMATION FROM A DOCUMENT

CROSS-REFERENCE TO RELATED APPLICATIONS

This application claims priority benefit from Indian Application No. 202111027338, filed Jun. 18, 2021, which is hereby incorporated by reference in its entirety.

BACKGROUND

1. Field of the Disclosure

This technology generally relates to methods and systems for extracting information from a document.

2. Background Information

One problem encountered by an organization, e.g., a financial institution, is an inability to efficiently and accurately extract information from received documents.

In many instances, documents are received from customers and/or clients via multiple channels, e.g., online directly by the customer, DocuSign®, e-mail, fax, and physical mail. When documents are received, each team of the organization may have their own process to review each of the received documents and determine the next step associated with the received document(s).

In many cases, such processes may involve one or more users, e.g., members/employees of the organization/institution, manually reviewing each document, determining if each document is complete, and manually extracting relevant information by, e.g., manually typing or entering (using, e.g., a keyboard or another input device) information into various systems, which is both inefficient and expensive. Further, different teams, sectors, or branches of the organization/institution may use different processes to extract information from received documents.

Accordingly, there is a need for a single service that, inter alia, eliminates manual data entry.

SUMMARY

The present disclosure, through one or more of its various aspects, embodiments, and/or specific features or sub-components, provides, inter alia, various systems, servers, devices, methods, media, programs, and platforms for extracting information from a document.

According to an exemplary embodiment, a method for extracting information from a document is provided. The method is implemented by at least one processor. The method includes: receiving a first document, extracting first data from the first document, assigning the first document to a first category from among a predetermined plurality of categories based on a result of the first data, and generating a first structured output by formatting the extracted first data based on the first category.

The method for extracting information from the document may further include determining a metric that relates to a confidence level with respect to either a result of the first data extraction, a result of the assigning the first document to the first category, or a result of both the first data extraction and the assigning the first document to the first category.

In the method for extracting information from the document, the extracting may include scanning the first document by using an optical character reader in order to obtain the first data In the method for extracting information from the document, the assigning may include using a machine learning algorithm that compares the first data from the first document to training data and assigns the first document to the first category based on the comparison.

In the method for extracting information from the document, the first document may be stored in a computer-readable file that may have one format or multiple formats such as, e.g., a .jpg format, a .tiff format, a .tif format, a .png format, a single-page .jpeg format, a .pdf format, or any combinations of the aforementioned exemplary formats.

The method for extracting information from the document may further include performing a signature matching function with respect to the first document by comparing the first structured output with a second document that includes a signature of a predetermined person.

The method for extracting information from the document may further include detecting a fraud occurrence based on a result of the signature matching function.

The method for extracting information from the document may further include integrating a bar code, a quick response (QR) code, or both into the first structured output.

The method for extracting information from the document may further include receiving redaction information relating to at least one proposed redaction of the first document; and modifying the first structured output based on the received redaction information.

The method for extracting information from the document may further include receiving a second document; extracting second data from the first document; assigning the second document to a second category from among the predetermined plurality of categories based on the result of the second data extraction; generating a second structured output by formatting the extracted second data based on the assigned second category; comparing the first structured output with the second structured output; and generating a third output that includes information that relates to at least one difference between the first document and the second document based on a comparison result.

According to another exemplary embodiment, a computing apparatus for extracting information from a document is provided. The computing apparatus includes a processor; a memory; and a communication interface coupled to each of the processor and the memory. The processor is configured to: receive, by the at least one processor, a first document; extract, by the at least one processor, first data from the first document; assign, by the at least one processor, the first document to a first category from among a predetermined plurality of categories (i.e., a taxonomy) based on a result of the extracting; and generate, by the at least one processor, a first structured output by formatting the extracted first data based on the assigned first category.

In association with the computing apparatus, the processor may further configured to determine a metric that relates to a confidence level with respect to either a result of the first data extraction, a result of the assigning the first document to the first category, or a result of both the first data extraction and the assigning the first document to the first category.

In association with the computing apparatus, the extraction may include scanning the first document by using an optical character reader in order to obtain the first data.

In association with the computing apparatus, the assigning may include using a machine learning algorithm that compares the first data from the first document to training data and assigns the first document to the first category based on the comparison.

In association with the computing apparatus, the first document may be stored in a computer-readable file that may have one format or multiple formats such as, e.g., a .jpg format, a .tiff format, a .tif format, a .png format, a single-page .jpeg format, a .pdf format, or any combinations of the aforementioned exemplary formats.

In association with the computing apparatus, the processor may be further configured to perform a signature matching function with respect to the first document by comparing the first structured output with a second document that includes a signature of a predetermined person.

In association with the computing apparatus, the processor may be further configured to detect a fraud occurrence based on a result of the signature matching function.

In association with the computing apparatus, the processor may be further configured to integrate bar code, a quick response (QR) code, or both into the first structured output.

In association with the computing apparatus, the processor may be further configured to: receive redaction information relating to at least one proposed redaction of the first document; and modify the first structured output based on the received redaction information.

In association with the computing apparatus, the processor may be further configured to: receive a second document; extract second data from the second document; assign the second document to a second category from among the predetermined plurality of categories based on the result of the second data extraction; generate a second structured output by formatting the extracted second data based on the assigned second category; compare the first structured output with the second structured output; and generate a third output that includes information that relates to at least one difference between the first document and the second document based on a comparison result.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
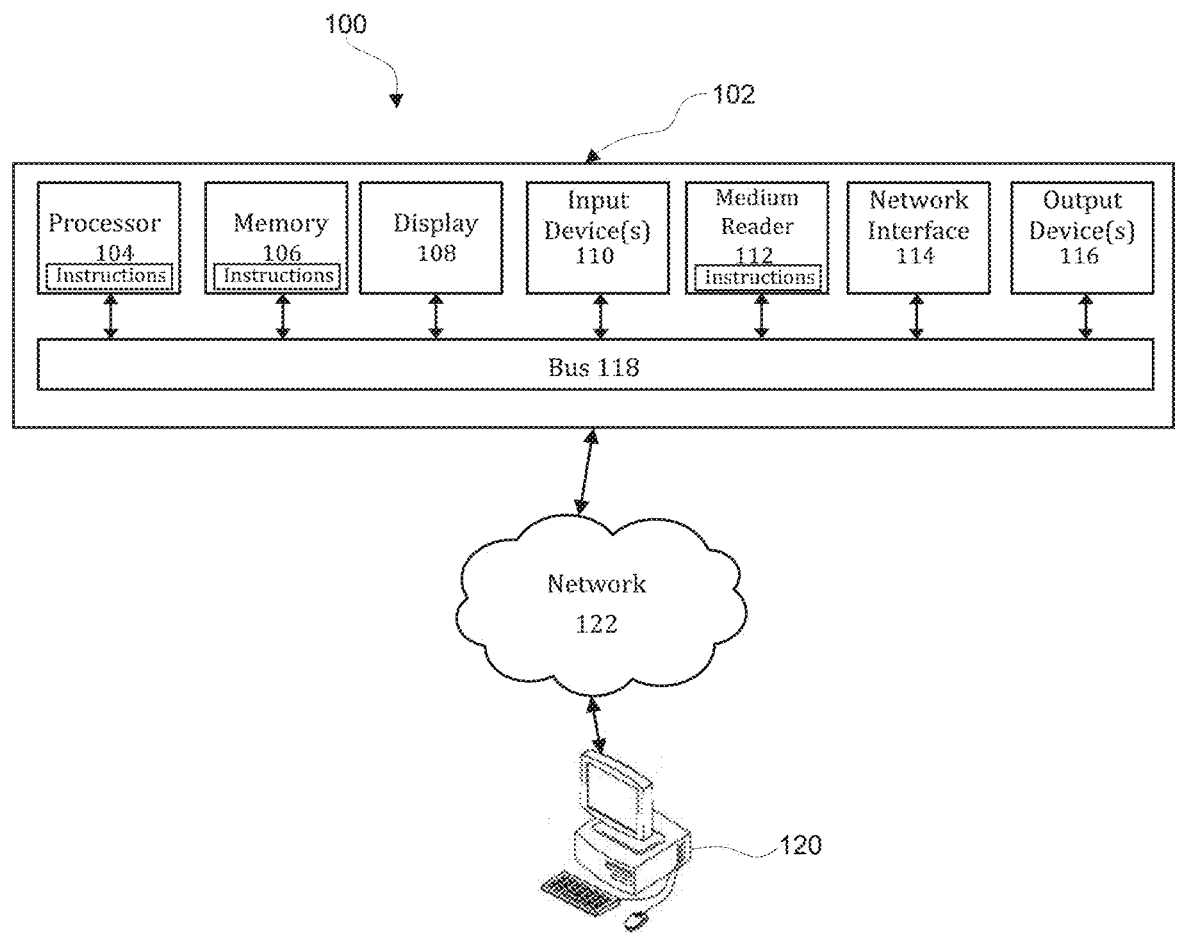
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for extracting information from a document.

Figure 2:
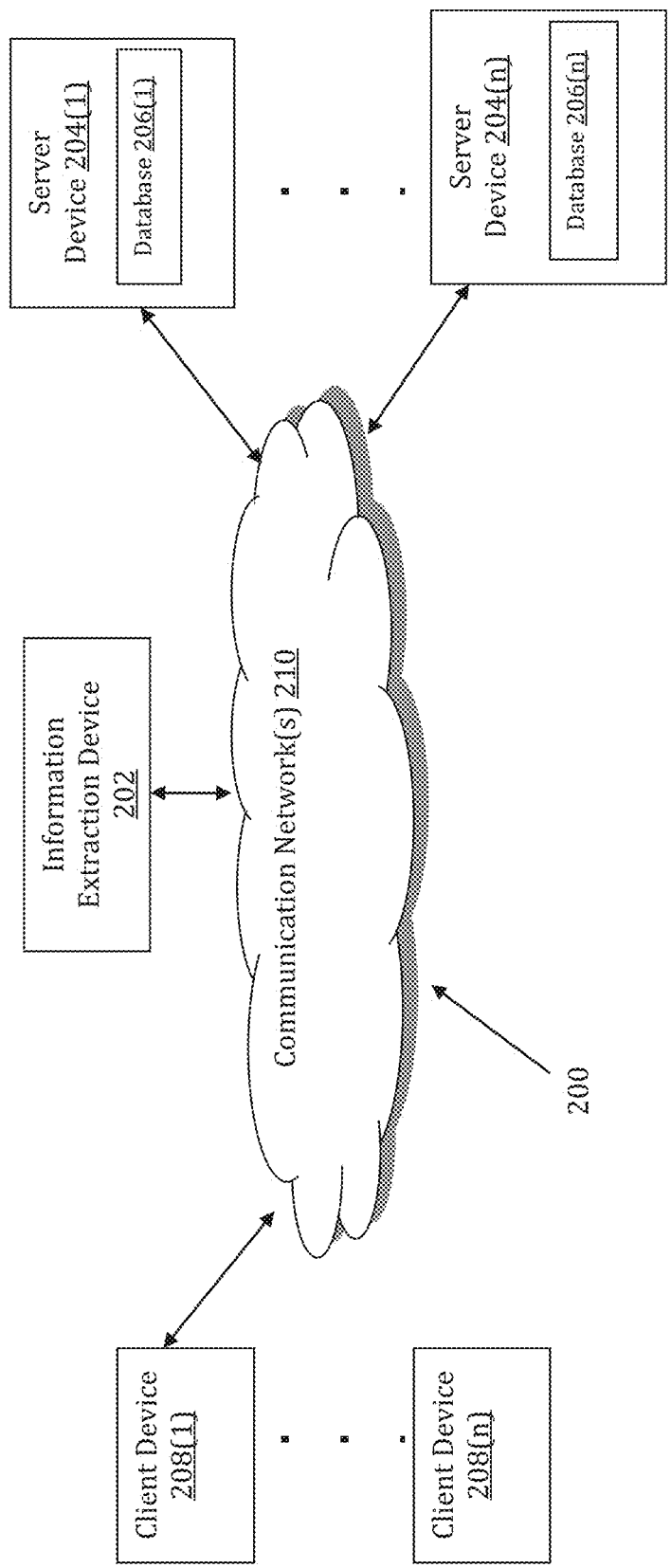
FIG. 2 illustrates an exemplary diagram of a network environment.

Referring to FIG. 2, a schematic of an exemplary network environment 200 for implementing a method for extracting information from a document is illustrated. In an exemplary embodiment, the method is executable on any networked computer platform, such as, for example, a personal computer (PC).

The method for extracting information from a document may be implemented by an Information Extraction (IE) device 202. The IE device 202 may be the same or similar to the computer system 102 as described with respect to FIG. 1. The IE device 202 may store one or more applications that can include executable instructions that, when executed by the IE device 202, cause the IE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the IE device 202 itself, may be located in virtual server(s) running in a cloud-based computing environment rather than being tied to one or more specific physical network computing devices. Also, the application(s) may be running in one or more virtual machines (VMs) executing on the IE device 202. Additionally, in one or more embodiments of this technology, virtual machine(s) running on the IE device 202 may be managed or supervised by a hypervisor.

In the network environment 200 of FIG. 2, the IE device 202 is coupled to a plurality of server devices 204(1)-204(n) that hosts a plurality of databases 206(1)-206(n), and also to a plurality of client devices 208(1)-208(n) via communication network(s) 210. A communication interface of the IE device 202, such as the network interface 114 of the computer system 102 of FIG. 1, operatively couples and communicates between the IE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the IE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and IE devices that efficiently implement a method for extracting information from a document.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The IE device 202 may be a standalone device or integrated with one or more other devices or apparatuses, such as one or more of the server devices 204(1)-204(n), for example. In one particular example, the IE device 202 may include or be hosted by one of the server devices 204(1)-204(n), and other arrangements are also possible. Moreover, one or more of the devices of the IE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the IE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to extracting information from a document.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the IE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with IE device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the IE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the IE device 202, the server devices 204(1)-204(n), or the client devices 208(1)-208(n), for example, may be configured to operate as virtual instances on the same physical machine. In other words, one or more of the IE device 202, the server devices 204(1)-204(n), or the client devices 208(1)-208(n) may operate on the same physical device rather than as separate devices communicating through communication network(s) 210. Additionally, there may be more or fewer IE devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
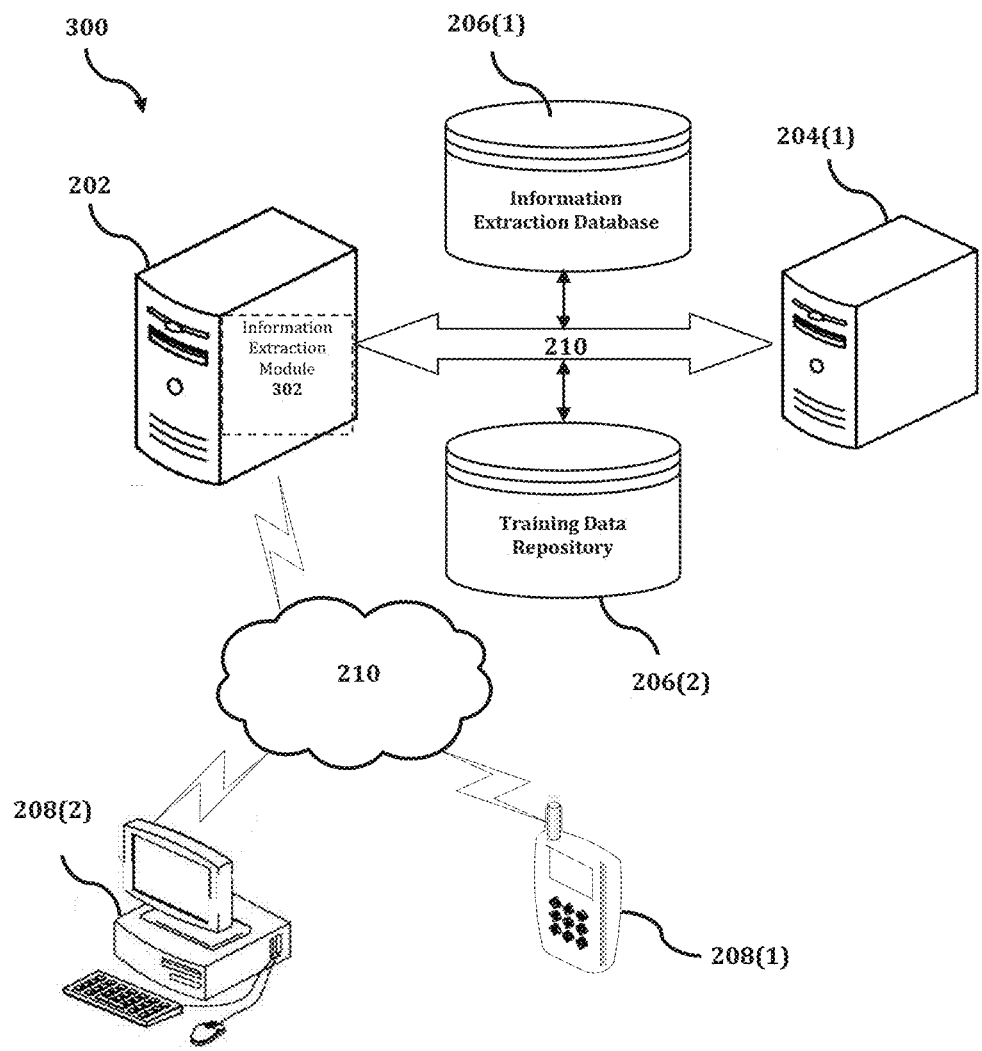
FIG. 3 shows an exemplary system for implementing a method for extracting information from a document.

The IE device 202 is described and shown in FIG. 3 as including an Information Extraction module 302, although it may include other rules, policies, modules, databases, or applications, for example. As will be described below, the Information Extraction module 302 is configured to implement a method for extracting information from a document.

An exemplary process 300 for implementing a mechanism for extracting information from a document by utilizing the network environment of FIG. 2 is shown as being executed in FIG. 3. Specifically, a first client device 208(1) and a second client device 208(2) are illustrated as being in communication with IE device 202. In this regard, the first client device 208(1) and the second client device 208(2) may be "clients" of the IE device 202 and are described herein as such. Nevertheless, it is to be known and understood that the first client device 208(1) and/or the second client device 208(2) need not necessarily be "clients" of the IE device 202, or any entity described in association therewith herein. Any additional or alternative relationship may exist between either or both of the first client device 208(1) and the second client device 208(2) and the IE device 202, or no relationship may exist.

According to an exemplary embodiment, client devices 208(1)-208(n) may be embodied by or related to a plurality of user devices. In an exemplary embodiment, a user device of the plurality of user devices may be associated with at least one individual of an organization. In another exemplary embodiment, a user device of the plurality of user devices may be associated with at least one team or group of individuals of the organization. In the instance of In yet another exemplary embodiment, a user device of the plurality of user devices may be associated with a location such as, e.g., an organization's headquarters, an organization's corporate office, an organization's retail location, an organization's sales office, an organization's administrative office, an organization's field office, or a home office of an individual of an organization.

In an exemplary embodiment, IE device 202 is illustrated as being able to access an information extraction database 206(1) and a training data repository 206(2). The Information Extraction module 302 may be configured to access these databases for implementing a method for extracting information from a document.

The first client device 208(1) may be, for example, a personal computer (PC). Of course, the first client device 208(1) may be any additional device described herein. The second client device 208(2) may be, for example, a smart phone. Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the IE device 202 via broadband or cellular communication. Of course, these embodiments are merely exemplary and are not limiting or exhaustive.

Upon being started, the Information Extraction module 302 executes a process for extracting information from a document. An exemplary process for extracting information from a document is generally indicated at flowchart 400 in FIG. 4.

Figure 4:
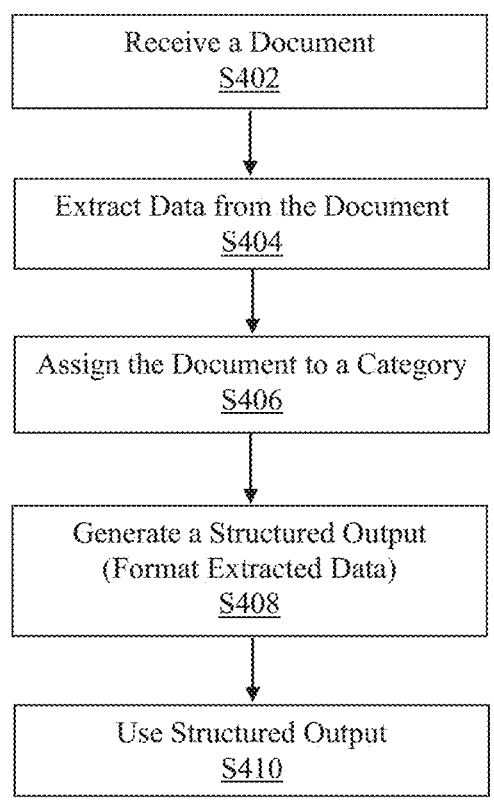
FIG. 4 is a flowchart of an exemplary process for implementing a method for extracting information from a document.

In the process 400 of FIG. 4, at step S402, the Information Extraction module 302 receives a first document. In an exemplary embodiment, the first document may be received from a client or a customer, and the first document may be received via the Internet, DocuSign®, fax, email, or physical mail. The first document may be in electronic or physical form.

In an exemplary embodiment, if the received first document is in physical form, the Information Extraction module 302 may digitize the first document such that the first document may be stored in digital form. The first document may be stored in a computer-readable file having a format that includes at least one from among a .jpg format, a .tiff format, a .tif format, a .png format, a single-page .jpeg format, and a .pdf format. The first document may be in the form of structured, semi-structured, or un-structured data.

At step S404, the Information Extraction module 302 extracts first data from the first document received in step S402. In an exemplary embodiment, the extracting includes scanning all or a portion of the first document by using an optical character reader in order to obtain the first data. The Information Extraction module 302 may extract all of the text and data content from the first document as the first data, and the Information Extraction module 302 may store the first data in the form of unstructured data. The stored first data may include a character set, a resolution of the first document (i.e., an indication of the extent to which the first document is blurry or clear), and Cartesian coordinates of the extracted text/data content. The Information Extraction module 302 may extract text in any one or more of a plurality of languages.

The extracting of the first data from the first document may include extracting individual pixels of the first document that may be processed by any one or more of, e.g., an image recognition algorithm, a machine learning algorithm, a deep learning algorithm, an artificial intelligence algorithm, and/or a neural network program/algorithm. The extracting of the first data from the first document may include the Information Extraction module 302 using natural language processing to process and analyze natural language data contained in the first document.

At step S406, the Information Extraction module 302 assigns the first document to a first category from among a predetermined plurality of categories based on a result of the extracting performed at step S404.

Categories included in the predetermined plurality of categories may include, e.g., a bank statement, a W-2 form, a 1099 form, a 1040 form, a tax return, a profit and loss statement, an income statement, a cash flow statement, a balance sheet, an accounts receivable statement, an accounts payable statement, a statement of changes in owners'/stockholders' equity, and a legal contract. There may be tens or hundreds of categories included in the predetermined plurality of categories.

In an exemplary embodiment, the Information Extraction module 302 assigns the first document to the first category of the predetermined plurality of categories by determining whether portions of the first data are included in a look-up table. The look-up table may include a list of the predetermined plurality of categories and correlation data that is associated with each category of the predetermined plurality of categories. Correlation data for each particular category of the predetermined plurality of categories may be data/information that is indicative of or unique to the respective category.

In an exemplary embodiment, the correlation data may be identical or similar to the name of the category of the predetermined plurality of categories. For example, a document of interest may be the first document and the extracting of the first data at step S404 may be executed via scanning the document of interest by using an optical character reader. The first data may include alphanumeric characters of the first document (document of interest) extracted by the optical character reader. A portion of the first data may include the alphanumeric character string or sequence "Form W-2." In the assigning step, S406, the Information Extraction module 302 may determine that this portion of the first data (i.e., alphanumeric character string/sequence "Form W-2") is included in correlation data for the "W-2 form" category of the predetermined plurality of categories. The Information Extraction module 302 may therefore assign the "W-2 form" category to the document of interest.

The portion of the first data that is consistent with the correlation data of the respective category of the predetermined plurality of categories is not necessarily identical or similar to the name of the category of the predetermined plurality of categories. For example, in an alternative embodiment in which the above-noted document of interest is the first document, a portion of the first data may include, e.g., the alphanumeric character string/sequence "1 Wages, tips, other compensation," "2 Federal income tax withheld," or "3 Social security wages." In the assigning step, S406, the Information Extraction module 302 may determine that this portion of the first data (i.e., alphanumeric character string/sequence "1 Wages, tips, other compensation," "2 Federal income tax withheld," or "3 Social security wages") is included in correlation data for the "W-2 form" category of the predetermined plurality of categories. The Information Extraction module 302 may therefore assign the "W-2 form" category of the predetermined plurality of categories to the document of interest.

The correlation data may include a specific location of a specific alphanumeric character string/sequence within the first document. The Information Extraction module 302 may require one piece of correlation data or a predetermined threshold amount of correlation data to correspond to the extracted first data to successfully assign the first document to the first category.

In an exemplary embodiment, when the extracting of the first data from the first document includes extracting individual pixels of the first document, the extracted individual pixels may be processed by any one or more of an image recognition algorithm, a machine learning algorithm, a deep learning algorithm, an artificial intelligence algorithm, and/or a neural network program/algorithm, and Information Extraction module 302 may use the image recognition, machine learning, deep learning, artificial intelligence, or neural network program/algorithm to assign the first document to the first category of the predetermined plurality of categories.

The image recognition, machine learning, deep learning, artificial intelligence, or neural network program/algorithm may be trained by using training data. The training data may include a plurality of documents that are each identified by a corresponding category of a predetermined plurality of categories. The image recognition, machine learning, deep learning, artificial intelligence, or neural network program/algorithm may store the training data and use the training data to determine which category, if any, of the predetermined plurality of categories, the first data resembles or most closely resembles. The Information Extraction module 302 may use pattern matching in the image recognition, machine learning, deep learning, artificial intelligence, or neural network program/algorithm.

The Information Extraction module 302 may use the first data extracted from the first document as training data to continuously train the image recognition, machine learning, deep learning, artificial intelligence, or neural network program/algorithm during normal operation.

In an exemplary embodiment, the Information Extraction module 302 may determine a metric that relates to a confidence level with respect a result of either the extracting performed at step S404, the assigning performed at step S406, or both of the extracting and assigning performed at steps S404 and S406, respectively. The metric may be, e.g., a percentage or a value between zero and one that indicates a confidence level with respect to either the extracting, the assigning, or both the extracting and the assigning.

In an exemplary embodiment, the first document may be of poor quality. The first document may include, e.g., dark, blurred, smeared, or smudged portions/marks, especially if the first document is a faxed or physical document.

The Information Extraction module 302 may determine a metric that relates to a confidence level with respect a result of the extracting performed at step S404. As noted above, the Information Extraction module 302 may obtain the first data from the first document via scanning all or a portion of the first document by using an optical character reader. The optical character reader may have difficulty reading or may be unable to read particular portions of the first document. For example, the optical character reader may be unable to or may be uncertain when attempting to read particular portions/characters of the first document. The Information Extraction module 302 may determine a metric that corresponds to, e.g., a percentage of the total document that it cannot read, a percentage of total characters that the optical character reader has determined include uncertainty, or a combination of such.

If the determined metric that relates to a confidence level with respect to a result of the extracting performed at step S404 is below a predetermined threshold, the Information Extraction module 302 may not proceed to the assigning performed at step S406 and may notify a user or administrator of the low metric.

The Information Extraction module 302 may determine a metric that relates to a confidence level with respect a result of the assigning performed at step S406.

In an exemplary embodiment, the Information Extraction module 302 image recognition, machine learning, deep learning, artificial intelligence, or neural network program/algorithm may output the metric that relates to the confidence level with respect the result of the assigning performed at step S406. The metric that relates to the confidence level with respect the result of the assigning performed at step S406 may represent a degree to which the first data resembles a category of the predetermined plurality of categories, based on the training data.

The Information Extraction module 302 may quantify the relationship between correlation data and the extracted first data as the metric that relates to the confidence level with respect the result of the assigning. If the extracted first data includes each and every piece of correlation data for a particular category, the metric that relates to the confidence level with respect to the result of the assigning may be 100% or 1.0. If the extracted first data does not include each and every piece of correlation data for a particular category, the metric that relates to the confidence level with respect to the result of the assigning may be less than 100% or less than 1.0. If the extracted first data does not include any piece of correlation data for any category of the predetermined plurality of categories, the metric that relates to the confidence level with respect to the result of the assigning may be zero.

In an exemplary embodiment, one category of the predetermined plurality of categories may refer to an unknown or unidentifiable category. If the extracted first data does not include any piece of correlation data for any category of the predetermined plurality of categories, the Information Extraction module 302 may assign the first document to the unknown or unidentifiable category. If the Information Extraction module 302 assigns the first document to the unknown or unidentifiable category, the Information Extraction module 302 may notify an administrator or user of this assignment, and the Information Extraction module 302 may prompt the administrator or user to enter training data corresponding to the unknown or unidentifiable category.

At step S408, the Information Extraction module 302 generates a first structured output by formatting the first data extracted at step S404 based on the first category assigned at step S406.

If the determined metric that relates to a confidence level with respect to a result of the assigning performed at step S406 is below a predetermined threshold, the Information Extraction module 302 may not proceed to the generating a structured output at step S408 and may notify a user or administrator of the low metric.

In an exemplary embodiment, the generating the first structured output includes generating a higher resolution version of the first document. The first structured output may be a fully text searchable version of the first document. The first structured output may include a bar code and/or a quick response (QR) code into the first structured output such that the bar and/or QR code of the first structured output may be quickly identified. If the first document includes multiple pages, each page of the first document may have a distinct bar and/or QR code.

The extracting performed at step S404, assigning performed at step S406, and generating performed at step S408 may include splitting the document into individual pages, processing each individual page of the document, extracting first data from each individual page, assigning each individual page of the first document to a category of the predetermined plurality of categories, and consolidating the individual pages.

At step S410, the Information Extraction module 302 may use the first structured output generated in step S408.

In an exemplary embodiment, the using of the first structured output includes the Information Extraction module 302 performing a signature matching function with respect to the first document by comparing the first structured output with a second document that includes a signature of a predetermined person. The Information Extraction module 302 may detect a fraud occurrence based on a result of the signature matching function. The fraud occurrence may be detected by determining a discrepancy between a first signature on the first document and a second signature on the second document, the first and second signatures being signatures that are supposed the signatures of the predetermined person. In addition to or alternatively to a signature matching function, a fraud occurrence may be detected by determining a discrepancy between a first font on a first document and a second font on a second document. The first and second fonts may include handwritten print that is determined to belong to two different people.

The using of the first structured output may include receiving redaction information relating to at least one proposed redaction of the first document and modifying the first structured output based on the received redaction information. The redacted information may be personal information of a client or customer. The redacted information may include social security numbers, individuals' addresses, birth dates, financial information, and other personally identifiable information.

The using of the first structured output may include receiving a second document, extracting second data from the second document, assigning the second document to a second category from among the predetermined plurality of categories based on the result of the extracting the second data from the second document, generating a second structured output by formatting the extracted second data based on the assigned second category, comparing the first structured output with the second structured output; and generating a third output that includes information that relates to at least one difference between the first document and the second document based on a result of the comparing.

In an exemplary embodiment, the first and second documents are first and second versions of a document, e.g., a legal contract, and the third output relates to changes that were made from the first version to the second version of the legal contract. If the third output indicates that there are no changes from the first document to the second document, the Information Extraction module 302 may determine the first document and the second document are the same version of the document.

The Information Extraction module 302 may receive any number of documents and perform the above process of determining the changes from one document to another. The Information Extraction module 302 may, e.g., receive hundreds of documents, determine the number of distinct versions, and present the distinct versions and changes between each version to a user or administrator. In this regard, the user or administrator does not need to closely examine each of the hundreds of documents to determine if and how they are different, which is a time consuming and tedious process and prone to human error.

Figure 5:
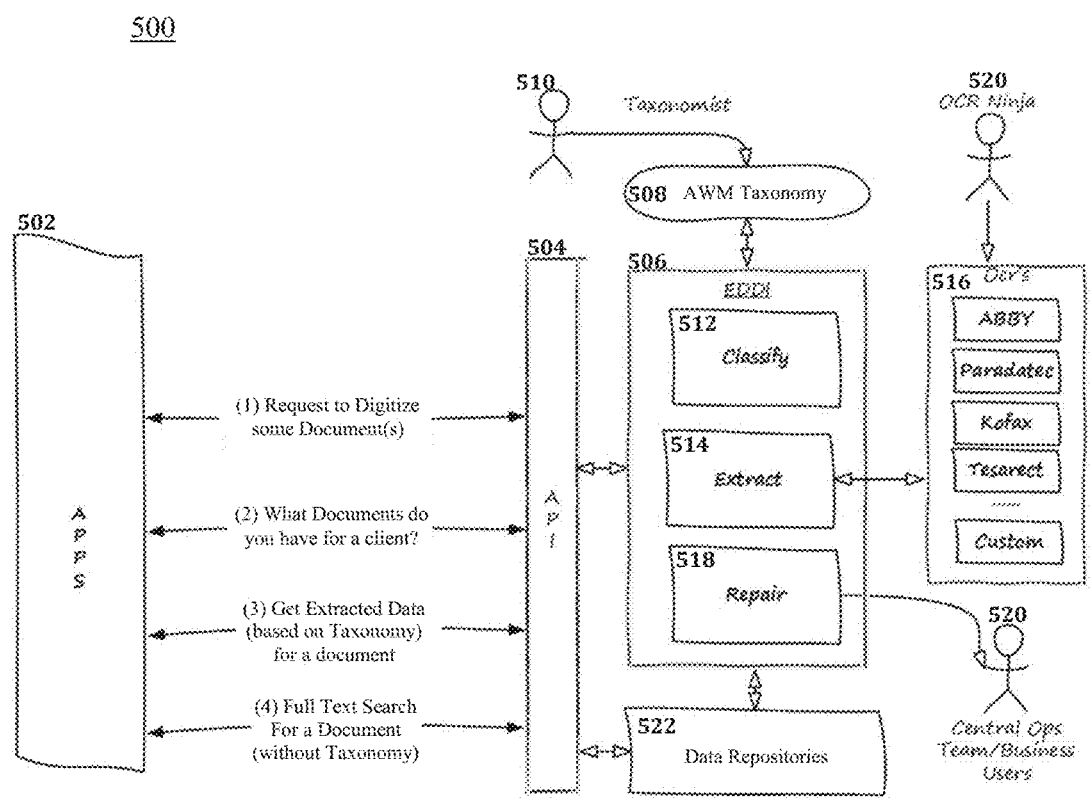
FIG. 5 is a first block diagram that illustrates an implementation of a method for extracting information from a document, according to an exemplary embodiment.

Referring to FIG. 5, a first block diagram 500 is shown. According to an exemplary embodiment, applications, APPS 502, which may be asset wealth management applications or other applications, communicate with an application programming interface, API 506. The APPS 502 may include, e.g., applications that a client, customer, user, employee, or member of an organization may interact with via a communication interface.

The APPS 502 and the API 506 may communicate with one another in order to, e.g., (1) submit a request to digitize a number of documents, process the request, digitize the number of documents by, e.g., scanning the document(s) using a scanner or an optical character reader (OCR); (2) assign a document type to the received/digitized document(s) based on, e.g., a result of the scan, a result from the OCR, a machine learning algorithm, or a combination of the same; (3) extract data from the received/digitized document(s) based on, e.g., the assigned document(s) type or a taxonomy for the document(s); and (4) generate, store, and/or make accessible a fully-text-searchable database/document(s) based on, e.g., the data extracted, wherein the generated, stored, or accessible fully-text-searchable database/document(s) may be without taxonomy.

In an exemplary embodiment, the API 504 communicates with an extraction and digitized document integration (EDDI) module 506. The EDDI module 506 may include a classify module 512, an extract module 514, and a repair module 518. The classify module 512 may classify a document type, the extract module 514 may extract data from the document, and the repair module 518 may add any missing information or correct any errors in the extracted data. The EDDI module 506 may communicate with a taxonomist 510, and the EDDI module 506 and taxonomist 510 may or have access to an asset and wealth management taxonomy, AWM taxonomy 508. The taxonomist 510 may be an individual who may indicate or designate the predetermined plurality of categories, which may be stored in the AWM taxonomy 508. According to an exemplary embodiment, the system is agnostic in that any variation of predetermined plurality of categories may be used, any software components which may define such categories may be used, and the any software/hardware may be integrated for storing information associated with the same. The EDDI module 506 may further communicate with one or more Data Repositories 522. The Data Repositories 522 may be any storage repository and may or may not include one or more Git repositories, Git being an open source software tool generally used to coordinate work among programmers and track changes made to files.

The extract module 514 may communicate with an optical character recognition module 516. The optical character recognition module 516 may include but is not limited to optical character recognition software such as, e.g., ABBYY, Paradatec, Kofax, Tesarect, or custom optical character recognition software. The optical character recognition module 516 may include a variety of optical character recognition software in order to leverage optimized optical character recognition components for a variety features including but not limited to converting scanned documents, PDF documents, and image documents (including digital photos) into editable/searchable documents, automatically classifying documents and capturing data from loan documents, high-speed scanning, indexing, detecting bar codes, supporting unicode, and recognizing tens or hundreds of languages. The optical character recognition module 516 may be in communication with an optical character recognition ninja 520. The optical character recognition ninja 520 may program the optical character recognition module 516 such that the extract module 514 utilizes a particular optical character recognition software based on the classification by the classify module 512.

The repair module 518 may communicate with a central operations team and/or business user(s) 520. The central operations team and/or business user(s) 520 may interact with the repair module 518 to add any missing information or correct any errors in the data extracted by the extract module 514.

Figure 6:
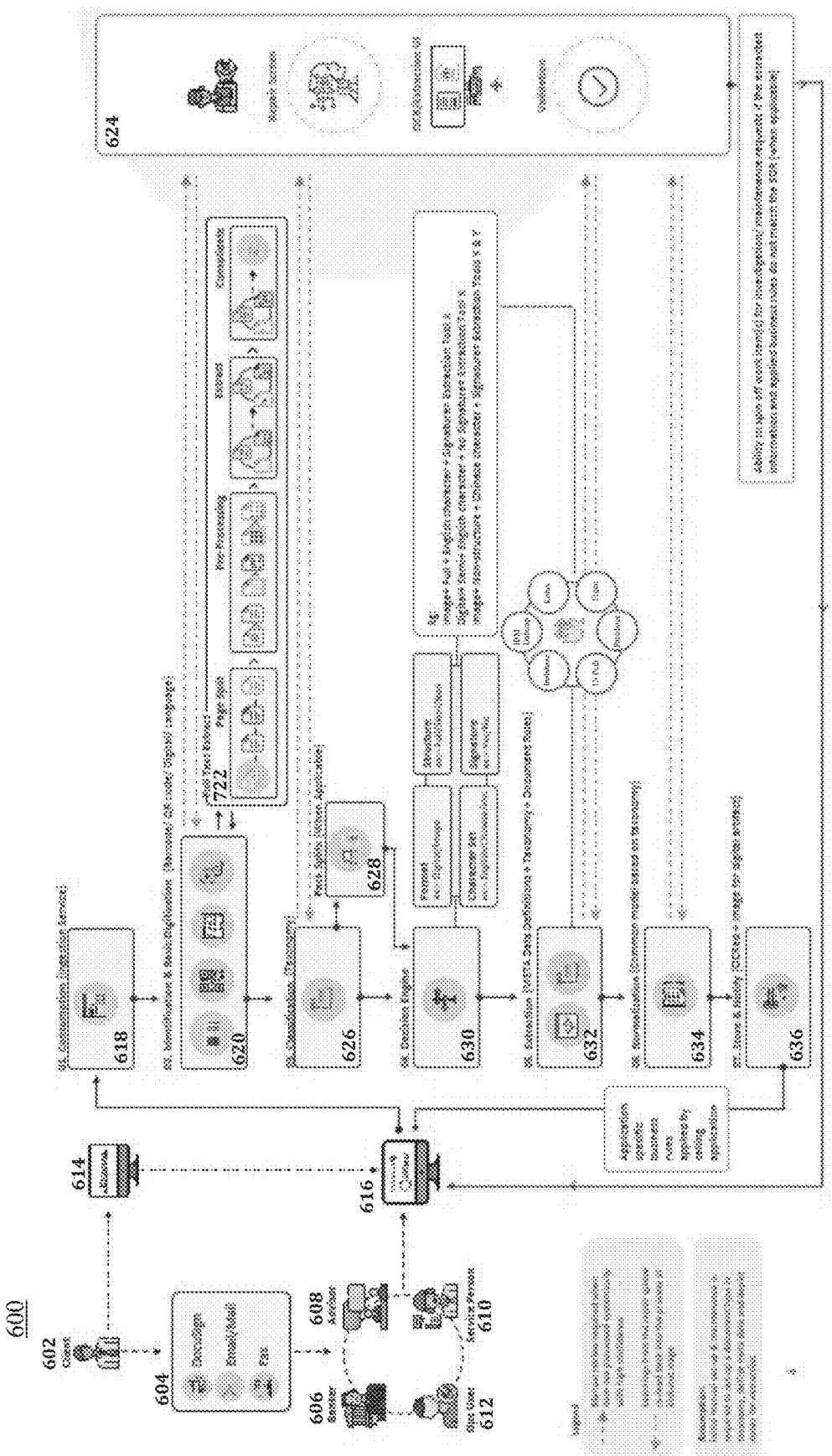
FIG. 6 is a second block diagram that illustrates an overview of a system for extracting information from a document, according to an exemplary embodiment.

Referring to FIG. 6, a client or customer 602 may interact with a first terminal 614. The client or customer 602 may send a document 604 via, e.g., DocuSign®, email, physical mail, or fax. The document 604 may be received by at least one of a banker 606, an advisor 608, a service person 610, and an operations user 612. At least one of the banker 606, advisor 608, service person 610, and operations user 612 may interact with a second terminal 616. The first terminal 614 and second terminal 616 communicate with one another and may be a computer or other electronic device.

As illustrated in FIG. 6, the second terminal 616 uses a consumption module 618 to receive the document 604. The first document 604 may be transferred to an identification and basic digitization module 620. In the identification and basic digitization module 620, the first document may be digitized, parsed with natural language processing software, and/or provided with a bar code and/or QR code. The identification and basic digitization module 620 may determine whether or not the document 604 is processed systematically with high confidence. In addition or alternative to a determination of whether the document 604 is processed systematically with high confidence, the identification and basic digitization module 620 may make a determination regarding with which client a document is associated. If the identification and basic digitization module 620 determines the document 604 is not processed systematically with high confidence and/or it is unclear with which client the document is associated, the document 604 may be transferred to a repair module 624 for manual review. In an exemplary embodiment, instead of using Boolean logic (i.e., determining a yes or no, true or false, or "0" or "1") in the determination of whether the document 604 was processed systematically with high confidence and/or in the determination of with which client the document is associated, the basic digitization module 620 may calculate confidence indicator(s) with respect to such determination(s). Each confidence indicator may indicate a level of confidence of the determination and may be, e.g., a number greater than or equal to zero and less than or equal to one with zero corresponding to the lowest degree confidence and one corresponding to the highest degree of confidence. The repair module 623 may include a repair screen, an optical character recognition and extraction user interface, and an indication of validation. The repair module 624 may allow a user to make investigation and/or maintenance requests if extracted information and applied business rules do not match the system of record (SOR). The repair module 624 may resolve any errors causing the document 604 not to be processed systematically with high confidence and the document 604 may be transferred back to the identification and basic digitization module 620. The document 604 may then be transferred to a full text extract module 722.

In the full text extract module 722, the document 604 may be split into individual pages, each individual page of the document 604 may be processed, data may be extracted from the document 604, and the individual pages of the document 604 may be consolidated.

The document may then be transferred to a classification or taxonomy module 626, which classifies the document 604 based on the information extracted in the identification and basic digitization module 620. The classification or taxonomy module 626 may determine whether or not the document 604 is processed systematically with high confidence. If the classification or taxonomy module 626 determines the document 604 is not processed systematically with high confidence, the document 604 may be transferred to a repair module 624 for manual review. The repair module 624 may resolve any errors causing the document 604 not to be processed systematically with high confidence and the document 604 may be transferred back to the classification or taxonomy module 626.

The document 604 may or may then be transferred to a pack splits module 628 which may split the document 604 into multiple documents if the classification or taxonomy module 626 determines the document 604 includes multiple classifications or taxonomies. The pack splits module 628 then may transfer the document(s) 604 to the decision engine module 630.

The decision engine module 630 may make a determination regarding which extraction engine of a plurality of extraction engines will be used. The decision engine module 630 may consider one or more of a plurality of attributes in making the determination regarding which extraction engine of a plurality of extraction engines will be used. Attributes that the decision engine module 630 may consider may include characteristics of the document(s), such as, inter alia, an indication of a resolution of the document(s) such as, e.g., an amount of dots per inch of the document(s); whether all or a portion of the document(s) are handwritten or typed; whether a signature and/or initials has/have been detected on the document(s); a type of character set of the document(s); a language present in the document(s); whether the document(s) are in digital format; whether the document(s) were scanned by a scanner; whether the document(s) include one or more tables.

In addition to or instead of using information relating to characteristics of a document itself, the decision engine module 630 may rely on other attributes that are not characteristics of a document in making a determination regarding which extraction engine of a plurality of extraction engines will be used. For example, the decision engine module 630 may consider attributes such as, e.g., a cost to use one or more of the plurality of extraction engines in determining which extraction engine of a plurality of extraction engines will be used. In an exemplary embodiment, the decision engine module 630 may choose to use an extraction engine having a lowest cost to perform the extraction when two or more of the plurality of extraction engines are capable of performing the extraction. An administrator of the system may configure or program the decision engine module 630 make particular determinations based on the attributes considered; however, the logic by which the decision engine module 630 determines which extraction engine of a plurality of extraction engines will be used is not particularly limited.

According to an exemplary embodiment shown in FIG. 6, the decision engine module 630 uses the following attributes: "document type," "structure," "character set," and "signature." The "document type" attribute may be, e.g., either "image" (corresponding to a document in an image file format, e.g., .jpg file format) or "digital" (corresponding to a document in a digital file format, e.g., .doc file format); the "structure" attribute may be, e.g., "full" (which corresponds to a fully structured document), "semi-structured" (which corresponds to a partially structured document), or "non-structured" (which corresponds to a document that is not structured); the "character set" attribute may be refer to the detected language of the document; and the "signature" attribute may refer to whether or not a signature is present on the document. In the exemplary embodiment, if the "document type," "structure," "character set," and "signature" attributes are respectively "image," "full," and "English characters," and "signature," the decision engine module 630 determines that a first extraction tool should be used. If the if the "document type," "structure," "character set," and "signature" attributes are respectively "digital," "semi," "English characters," and "no signature," the decision engine module 630 may again use the first extraction tool. However, if the "document type," "structure," "character set," and "signature" attributes are respectively "image," "non-structured," "Chinese characters," and "signature," the decision engine module 630 may use both the first extraction tool and a second extraction tool. From the decision engine module 630, the document(s) 604 may be transferred to the extraction module 632 in accordance with the decision by the decision engine module 630.

The extraction module 632 uses the extraction tool specified in the decision engine to extract data from the document(s) 604. The extraction module 632 may use one or more of the following software components: Instabase, UI Path, Paradatec, Eigen, Kofax, or IBM Datacap, or any like tool or engine. The extraction module 632 may extract metadata definitions, taxonomy, and document rules. The extraction module 632 may determine whether or not the document 604 is processed systematically with high confidence. If the extraction module 632 determines the document 604 is not processed systematically with high confidence, the document 604 may be transferred to a repair module 624 for manual review. The repair module 624 may resolve any errors causing the document 604 not to be processed systematically with high confidence and the document 604 may be transferred back to the extraction module 632. The extraction module 632 may be configured such that the document 604 is either always sent to the repair module 624, never sent to the repair module 624, or sometimes sent to the repair module 624 based on certain criteria. This criteria may include, e.g., whether a particular document includes a predetermined deficiency or whether certain aspects of a document meet a predetermined threshold, e.g., with respect to the above-noted exemplary attributes considered by the decision engine module 630. The ability to configure the extraction module 632 in this regard advantageously provides flexibility with respect to sending the document(s) to the repair module 624.

The document(s) 604 may be transferred from the extraction module 632 to the store and notify module 634. The store and notify module 634 may be used to store a fully text searchable version of the document(s) 604 and/or a digital image version of the document(s) 604.

The document(s) 604 are then transferred back to the second terminal 616. In an exemplary embodiment, application specific business rules are applied by calling an application from the second terminal 616.

According to an exemplary embodiment, EDDI module 506 is system agnostic in that, e.g., the EDDI module 506 is able to operate with any software component used. The software components Instabase, UI Path, Paradatec, Eigen, Kofax, or IBM Datacap, etc. may be software components that originate from one or more vendors or suppliers.

Each software component may be specifically assigned, designated, and/or used for one or more particular categories or document types, the document categories/types may include but may not be limited to a bank statement, a W-2 form, a 1099 form, a 1040 form, a tax return, a profit and loss statement, an income statement, a cash flow statement, a balance sheet, an accounts receivable statement, an accounts payable statement, a statement of changes in owners'/stockholders' equity, and a legal contract.

The EDDI module 506 may process a document by first making an initial determination as to the document category/type. Then the EDDI module 506 may route the document (or information pertaining or relating to the document) to a particular software component that is assigned/designated/used for the determined document category/type. The EDDI module 506 may be robust in that the software components may be added or removed without affecting system operability. Further, a configuration regarding which software component is assigned/designated/used for particular document categories/types may be modified without affecting system operability.

An advantage of such a robust system may be that the EDDI module 506 may easily adapt to accommodate new or updated document types or categories, and the EDDI module 506 may further easily adapt to accommodate new or updated software components, which may or may not be released by existing or new vendors or suppliers.

According to another exemplary embodiment, the APPS 502 with which a client, customer, user, employee, or member of an organization may interacts provides the same or a substantially consistent user experience regardless of which software component is used.

A software components from a vendor may offer a user interface provided by the vendor. Many software components from many vendors or suppliers may provide a variety of features but each software component from each vendor may use a different user interfaces. It may be cumbersome, inconvenient, and frustrating for a client, customer, user, employee, or member of an organization to learn how to operate each vendor's user interface.

To address this inconvenience, the APPS 502 may use a plurality of vendors' or suppliers' software components, but provide a single user interface with which the client, customer, user, employee, or member of an organization may interact. With such a configuration, the client, customer, user, employee, or member of an organization may benefit by having the ability to use features from multiple software components from multiple vendors or suppliers while only being required to learn the operation of a single user interface.

Accordingly, with this technology, an optimized process for extracting information from a document is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for extracting information from a document, the method with a memory storing instructions being implemented by at least one processor, the method comprising:
receiving, by the at least one processor, a first document;
extracting, by the at least one processor, first data from the first document;
assigning, by the at least one processor, the first document to a first category from among a predetermined plurality of categories based on a result of the extracting the first data from the first document;
generating, by the at least one processor, a first structured output by formatting the extracted first data based on the first category;
performing a signature matching function with respect to the first document by comparing the first structured output with a second document that includes a signature of a predetermined person; and
determining, based on a result of the performing of the signature matching function, a discrepancy between the first structured output and the signature of the predetermined person,
wherein the first data includes an indication of a resolution of the document based on an amount of dots per inch of the document, and wherein the first data includes at least one of whether at least a portion of the document is handwritten, whether at least a portion of the document is typed, whether initials are detected on the document, a type of character set of the document, a language present in the document, whether the document is in a digital format, whether the document is scanned by a scanner, and whether the document includes at least one table.

2. The method of claim 1, further comprising determining, by the at least one processor, a metric that relates to a confidence level with respect to a result of at least one from among the extracting and the assigning.

3. The method of claim 1, wherein the extracting comprises scanning the first document by using an optical character reader in order to obtain the first data.

4. The method of claim 1, wherein the assigning comprises using a machine learning algorithm that compares the first data from the first document to training data and assigns the first document to the first category based on the comparison.

5. The method of claim 1, wherein the first document is stored in a computer-readable file having a format that includes at least one from among a .jpg format, a .tiff format, a .tif format, a .png format, a single-page jpeg format, and a .pdf format.

6. The method of claim 1, further comprising detecting a fraud occurrence based on a result of the signature matching function.

7. The method of claim 1, further comprising integrating at least one from among a bar code and a quick response (QR) code into the first structured output.

8. The method of claim 1, further comprising:
receiving redaction information relating to at least one proposed redaction of the first document; and
modifying the first structured output based on the received redaction information.

9. The method of claim 1, further comprising:
receiving a second document;
extracting second data from the second document;
assigning the second document to a second category from among the predetermined plurality of categories based on the result of the extracting the second data from the second document;
generating a second structured output by formatting the extracted second data based on the second category;
comparing the first structured output with the second structured output; and
generating a third output that includes information that relates to at least one difference between the first document and the second document based on a result of the comparing.

10. A computing apparatus for extracting and storing information from a document, the computing apparatus comprising:
a processor;
a memory storing instructions being implemented by the processor; and
a communication interface coupled to each of the processor and the memory, wherein
the processor is configured to:
receive a first document;
extract first data from the first document;
assign the first document to a first category from among a predetermined plurality of categories based on a result of the extracting;
generate a first structured output by formatting the extracted first data based on the first category;
perform a signature matching function with respect to the first document by comparing the first structured output with a second document that includes a signature of a predetermined person; and
determine, based on a result of the performance of the signature matching function, a discrepancy between the first structured output and the signature of the predetermined person,
wherein the first data includes an indication of a resolution of the document based on an amount of dots per inch of the document, and wherein the first data includes at least one of whether at least a portion of the document is handwritten, whether at least a portion of the document is typed, whether initials are detected on the document, a type of character set of the document, a language present in the document; whether the document is in a digital format, whether the document is scanned by a scanner, and whether the document includes at least one table.

11. The computing apparatus of claim 10, wherein the processor is further configured to determine a metric that relates to a confidence level with respect to a result of at least one from among the extracting and the assigning.

12. The computing apparatus of claim 10, wherein the extracting comprises scanning the first document by using an optical character reader in order to obtain the first data.

13. The computing apparatus of claim 10, wherein the assigning comprises using a machine learning algorithm that compares the first data from the first document to training data and assigns the first document to the first category based on the comparison.

14. The computing apparatus of claim 10, wherein the first document is stored in a computer-readable file having a format that includes at least one from among a .jpg format, a .tiff format, a .tif format, a .png format, a single-page .jpeg format, and a .pdf format.

15. The computing apparatus of claim 10, wherein the processor is further configured to detect a fraud occurrence based on a result of the signature matching function.

16. The computing apparatus of claim 10, wherein the processor is further configured to integrate at least one from among a bar code and a quick response (QR) code into the first structured output.

17. The computing apparatus of claim 10, wherein the processor is further configured to:
receive redaction information relating to at least one proposed redaction of the first document; and
modify the first structured output based on the received redaction information.

18. The computing apparatus of claim 10, wherein the processor is further configured to:
receive a second document;
extract second data from the second document;
assign the second document to a second category from among the predetermined plurality of categories based on the result of the extracting;
generate a second structured output by formatting the extracted second data based on the second category;
compare the first structured output with the second structured output; and
generate a third output that includes information that relates to at least one difference between the first document and the second document based on a result of the comparing.

* * * * *